April 21, 1959     W. LEE     2,882,596
HEDGE TRIMMER ATTACHMENT

Filed Oct. 15, 1956     2 Sheets—Sheet 1

INVENTOR.
WALTER LEE
BY *Golrick & Golrick*
ATTORNEYS

April 21, 1959 W. LEE 2,882,596
HEDGE TRIMMER ATTACHMENT

Filed Oct. 15, 1956 2 Sheets-Sheet 2

INVENTOR.
WALTER LEE
BY Golrick & Golrick
ATTORNEYS

United States Patent Office 2,882,596
Patented Apr. 21, 1959

2,882,596

HEDGE TRIMMER ATTACHMENT

Walter Lee, Towson, Md., assignor to The Black & Decker Manufacturing Company, Towson, Md., a corporation of Maryland Application October 15, 1956, Serial No. 615,797

1 Claim. (Cl. 30—216)

The present invention is concerned with hedge trimmers of the reciprocating blade type and more particularly with a hedge trimmer attachment adapted for use in combination with a portable motor driven hand tool, specifically a hand electric drill.

The primary object of the invention is to provide a hedge trimmer attachment which may be readily attached to the casing of an electric drill with provision for obtaining a driving connection from the output shaft or other rotationally driven output member of the drill to power the cutting blades.

Another object of the invention is the provision of a hedge trimmer attachment for an electric drill including means for engagement with the casing which ensures a secure positioning of the rotationally driven output element of the drill with respect to an input element of the motion converting mechanism in the trimmer. A still further object of the invention is the provision of a hedge trimmer attachment which when used in combination with a portable hand type electric drill provides a well-balanced, easily maneuverable hedge trimming tool including handle or manipulating means adjustable to accommodate the tool as a whole to the left or right handedness of the operator, and also to vary or adjust the location of the handle of the tool to compensate in some degree for various weight distributions encountered with various drills with which the attachment might be used. Other objects and advantages of the invention will appear from the following description and the drawings wherein:

Fig. 3 is an end view of the tool or attachment viewed from the outboard end of the blades.

Figure 1:
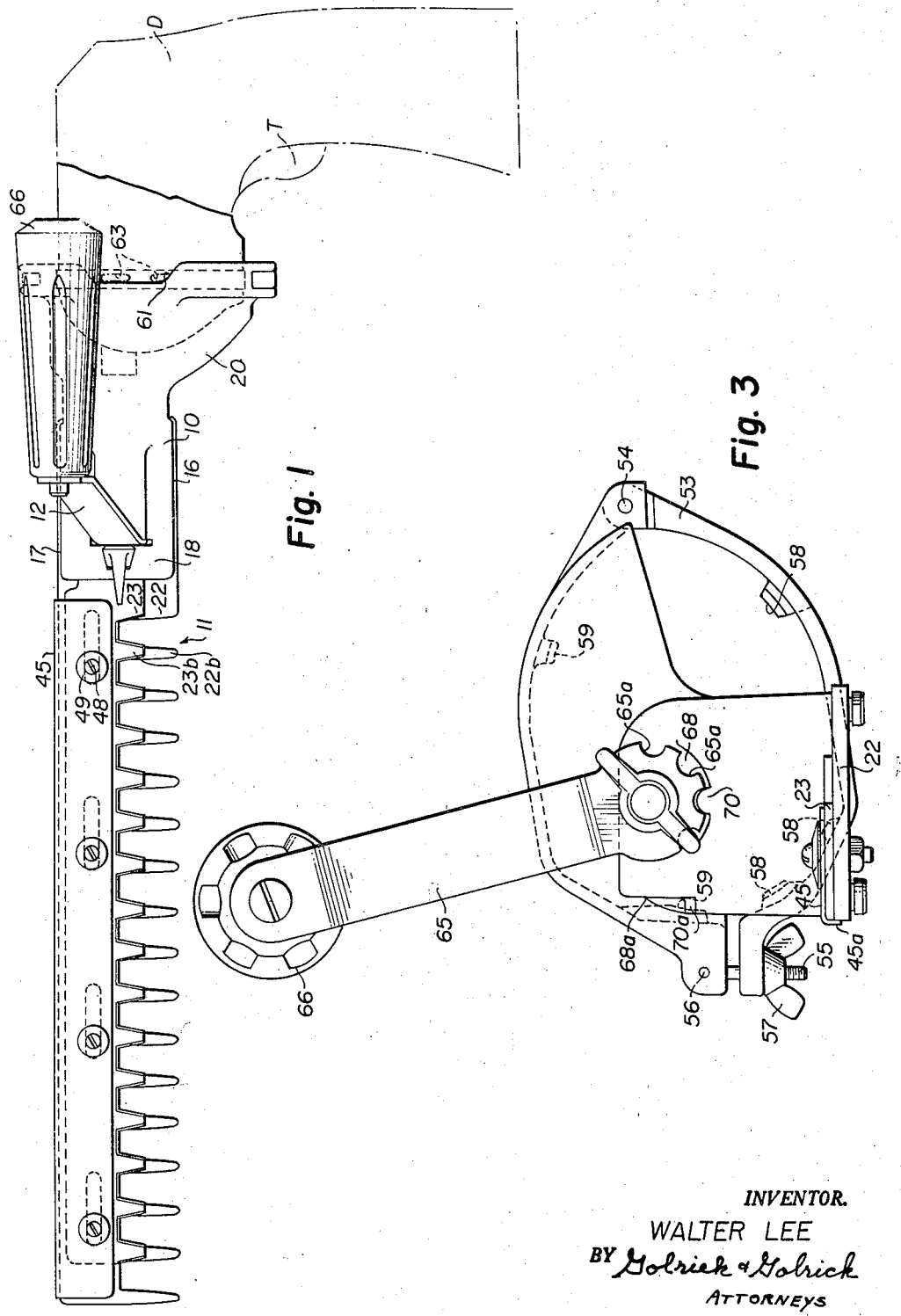
Fig. 1 is taken as a plan view of a hedge trimmer attachment of this invention.
Figure 2:
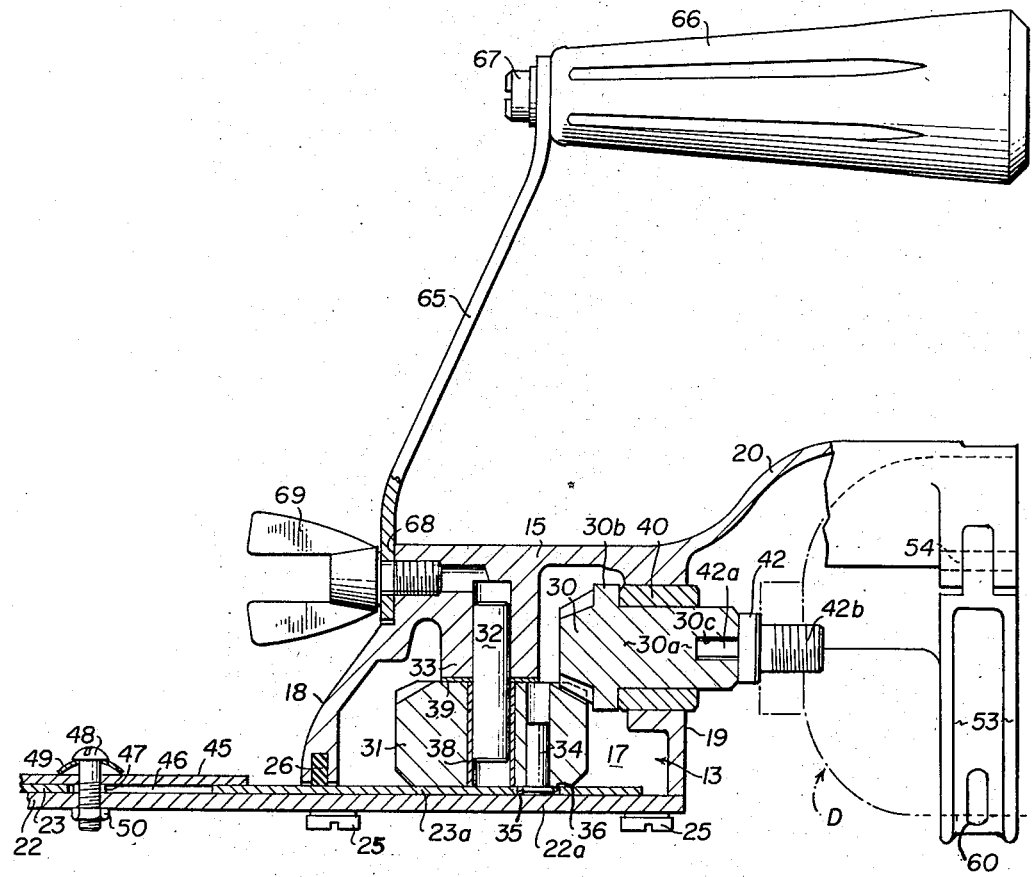
Fig. 2 is a side view looking toward the cutting edge of the blades, with certain parts broken away for clarity of representation.

As may be seen in the drawings, Figs. 1 and 2, the hedge trimmer attachment of this invention includes as principal elements a frame 10 adapted to clamp therein an electric hand drill D shown in dashed outline, a shearing blade assembly 11 carried by the frame, a handle assembly 12 movably and adjustably secured to the frame, and a motion converting mechanism 13 enclosed in a housing provided in frame 10 for converting rotational motion of an output element of the drill to a reciprocation motion in the blade assembly.

Frame 10 may, for example, be an integral die casting providing a top wall portion 15 merging into side wall portions 16, 17, a front wall portion 18 and a back wall portion 19 forming the aforementioned mechanism-enclosing housing, and a downwardly concave shell 20 extending rearwardly from the junction of the top and rear walls 15 and 19 at a level generally above the top wall portion. The blade assembly 11, hereinafter more fully described, includes an elongated relatively broad stationary blade 22 and a narrower blade 23 superimposed thereon in face-to-face, parallel relation for relative longitudinal reciprocation; and the assembly is secured to the bottom of the housing provided by the frame 10. To this end, the back end 22a of the stationary blade bears flatwise on the flat bottom edge faces of a continuous housing bottom flange formed by the side and back walls 16, 17 and 19, and the stationary blade is secured thereto as a housing closure by four screws 25 passed through the fixed blade and threaded upwardly into the corners of the housing.

The bottom edge of the forward wall 18 (at its forwardly offset portion) over the greater part of its length is relieved or recessed to accommodate the tang or rear end of the movable blade extending into the housing and the bottom face of the relieved portion is slotted or grooved to receive a grease seal member 26 extending transversely across the width of the reciprocating blade. The grease seal insert may be any suitable resilient material adapted to withstand the action of grease enclosed in the housing for the converting mechanism and also wiping action of the reciprocating blade.

The motion converting mechanism is comprised of a bevel pinion 30 rotatably mounted in the rear wall of the housing for rotation about a horizontal axis parallel to the length of the blades and driven by the drill D; a bevel gear 31 meshed with the pinion and supported for rotation on a dependent vertical stud 32 pressed into a bored inwardly projecting boss 33 formed on the inside of the top wall; and a pin 34 carried eccentrically by gear 32 having a headed portion engaged through a thin flat cylindrically annular roller element 35 thereon, in a slot 36 formed in and transversely to the width of the reciprocable blade end within the housing. The roller is of course of diameter slightly smaller than the slot width for alternating rolling contact with one side and operating clearance with the other, and the slot length is great enough to permit orbital movement of the roller 35 upon rotation of the bevel gear to reciprocate the blade.

As here shown, the gear 31 is bushed with a sleeve bearing element 38 and a washer 39 is interposed between the boss end and face of the gear, the other face of the gear bearing on the flat of blade end 23a so that the gear is held in axial position thereby.

The pinion 30 is formed with an integral stud 30a projecting beyond radial flange 30b through a bearing bushing 40 pressed into a corresponding bore in the back wall 19 and the rearwardly projecting end of such stud is slotted at 30c to receive the end tongue 42a of a connecting or coupling element 42 in a partially self-adjusting or aligning tongue and slot connection. The rearward outer end 42b is adapted to be received and rotationally engaged in an output element of drill D, as here shown, by a suitable thread whereby element 42 is secured into a complementary female threaded socket in the output shaft or element of the drill, in place of the usual chuck.

With the sleeve 40, and therefore the end wall bore larger in diameter than flange 30b, after gear 31 is positioned the sleeve and pinion may be pressed into the end wall bore bringing the pinion into properly meshed relation with the gear to be there held and located between the gear face and sleeve end bearing on the radial shoulder of flange 30b.

The blade assembly includes the aforementioned lower fixed and upper reciprocable blades 22, 23 and an uppermost cover or retaining plate 45 overlying the movable blade and longitudinally flanged at 45a downwardly along the substantially vertically aligned non-cutting edges of the blades, thereby to form a guide and retainer for the movable blade. The reciprocable blade has a series of longitudinally directed and spaced slots 46 along its length, each extending parallel to the blade length with a spacer and guide washer 47 located in each slot. The assembly is held together by screws 48 each passed through a corresponding spring washer 49, the cover plate, a guide washer 47 and the fixed blade for securement by nuts 50. The spacer washers are at least the thickness of the reciprocating blade and preferably may be slightly thicker so as to insure suitable operating clearance for the reciprocation blade between cover blade and fixed blade by preventing overtightening of the cover plate. The spacer washers also serve in conjunction with the blade slots as further guide means for the reciprocating blade.

On the stationary plate, a series of equi-spaced elongated fingers 22b project from the cutting side of the assembly to gather and guide stems of material to be cut in suitably bunched groups into the inner ends of the slots formed therebetween as shearing edges cooperating with the wedge shaped sharpened cutting fingers 23b equi-spaced along and integral with blade 23. Preferably the spacing in the series of teeth 23b is slightly different and smaller than that in the fingers 22b so that the cutting phase relationship among different cooperating shearing elements 22a, 22b varies along the length of the assembly, the better timewise to distribute the cutting load. Preferably the stationary fingers 22b are about two to two and one-half times as long as the cutting fingers or elements 23b for suitable bunching and delivery of stems to the shearing area.

A curved swingable clamp element 53 at one end is reduced to form a tongue projecting into a slot between ears formed on one side of shell 20 and is hinged by a pin 54 between such ears. At the other end of the clamp piece the end is slotted to receive a swing bolt 55 likewise pinned at 56 to be hinged between ears formed on the other side of shell 20 to provide for a clamping engagement by a wing nut 57 threaded on bolt 55 to bear on the free slotted end of the clamp piece.

A series of spaced inwardly projecting coplanar lugs 58, 59 are formed on the concave inner faces of the clamp 53 and shell 20 respectively, whereby ventilating air slots 63 arranged in coplanar relationship around the periphery of the forward end of the casing of an electric drill may be engaged to hold the drill clamped between shell 20 and the clamp piece 53. Further, slots 60 formed in clamp 53 coplanar with lugs 58, and also a cut-out portion 61 in the rear edge of the shell 20 provide openings for free movement of air with respect to the ventilating air ports of the drill motor casing.

In the handle assembly a bracket 65, formed of strip or plate stock to have parallel offset end portions, at its outer end carries a suitable handle element 66 secured by a cap screw 67 passed through the bracket end with lock washer into endwise threaded engagement with the handle. The other bracket end, generally rounded and centrally apertured is secured in face-to-face relationship against a flat front seat formation 68 or side seat formation 68a on side wall 17 by a wing screw 69 passed through a lock washer and the bracket end for threaded engagement with a suitable threaded bore in such seats. A lug formation 70 or 70a on the lower part of the respective seat formations is selectively engaged in one of a series of complementary notches 65a arcuately arranged on the rounded end of bracket 65 in similar relation to and about the aperture, so that the angular adjustment of the handle assembly may be changed relative to the frame of the trimmer attachment.

Thus the handle assembly may be reversed in the direction of extension of the handle from that shown in the drawings where attached at front seat 68, and may be attached in either of the two similarly opposed relations at the side seat 68a with angular adjustment at either position, with further variation of disposition of the handle for each of the bracket positions by reversing the handle solely with respect to the bracket. Furthermore, with the handle 66 axially bored to accommodate the head of cap screw 67 and a screw driver, the cap screw may be threaded through the end of the handle element 66 to form a projecting stud whereby the handle itself may be attached directly to either the front or side seat.

As shown in the drawing, the drill with which the attachment is combined as an operating tool unit is disposed with its handle extending horizontally out toward the same side as the cutting edge of the blades so that the trigger T is readily accessible in full view, and further the handle itself is disposed so that the tool as a whole is somewhat more compact and more readily manageable. As a further feature of the adjustment, some compensation may be made in the handle position relative to the center of gravity of the tool not only for convenience and comfort of the individual operator but also to achieve a normal optimum cutting disposition of the plane of the blades, which for more or less horizontal cuts has been found generally to be a downward forward inclination on the order of about 15° to the horizontal.

I claim:

A hedge trimming tool attachment for a hand portable type electric drill having a rotationally driven output member and a motor casing provided with a plurality of circumferentially spaced ventilating air apertures, the combination comprising a frame forming a motion-converting mechanism housing, a cutter blade assembly mounted on the frame for a cutting operation in a region in front of one end of the frame, a motion-converting mechanism in said housing for actuating said cutter blade assembly by rotary movement of the drill output member, said mechanism having an input shaft journalled in and projecting externally from a bore through a rear wall portion of said housing, clamping means including as a fixed element an integral saddle-like portion of said frame projecting outwardly from said wall portion into a radially spaced relation with the axis of the input shaft and a movable element adjustably swingably secured thereto, said elements being of opposed concave shapes and each provided with lugs adapted for insertion in some of said apertures for cooperatively engaging and clamping circumferentially a casing portion of said drill with said output member in substantial alignment with said shaft, and coupling means adapted to connect said output member with said shaft.

References Cited in the file of this patent
UNITED STATES PATENTS

| | | |
|---|---|---|
| 1,407,748 | Hermann | Feb. 28, 1922 |
| 2,243,641 | Miller | May 27, 1941 |
| 2,256,779 | McHenry | Sept. 23, 1941 |
| 2,274,924 | Hill | Mar. 3, 1942 |
| 2,458,200 | Renfroe et al. | Jan. 4, 1949 |
| 2,558,459 | Podner | June 26, 1951 |
| 2,607,113 | James | Aug. 19, 1952 |
| 2,629,220 | Grieder | Feb. 24, 1953 |
| 2,709,300 | Blomberg | May 31, 1955 |
| 2,763,925 | Asbury | Sept. 25, 1956 |